Nov. 20, 1962   B. BRONFMAN   3,064,312
COMPRESSION MOLDING OF PLASTIC MATERIALS
Filed July 28, 1959

INVENTOR
BENJAMIN BRONFMAN
BY
*Jerome Bauer*
ATTORNEY.

United States Patent Office 3,064,312
Patented Nov. 20, 1962

3,064,312
COMPRESSION MOLDING OF PLASTIC
MATERIALS
Benjamin Bronfman, Rockville Centre, N.Y.
(3395 Colony Drive, Baldwin, N.Y.)
Filed July 28, 1959, Ser. No. 830,080
7 Claims. (Cl. 18—55)

This invention relates to improvements in compression molding of plastic materials and particularly with respect to the orientation of pearl essence contained therein in order to produce improved designs in the pearl reflecting surfaces of the molded products.

Early methods of compression molding required the molding composition to be added to the mold form cavities in a solid condition, and then to be heat treated under pressure until the material was cured, after which the molded article was removed. This was not satisfactory, and new procedures were attempted, particularly in relation to the compression molding of liquid, thermo-setting resinous compositions. One such method prepolymerizes an unsaturated, thermosetting liquid polyester composition by adding an organic peroxide catalyst and heating at about 150° F. temperature for approximately one and one-half hours. On cooling, a pearl-essence is homogenously added, air is evacuated and the thick composition is poured into a mold to be further heated in a press until a hard, insoluble product is obtained.

This process was not satisfactory, however, since the luster of the pearl essence was often diminished and the wavy mother-of-pearl design was lost. In order to overcome these deficiencies, the instant process has been devised. This invention provides a process whereby a predictable range of designs is obtained with the pearl luster at a maximum.

While the explanation of the process of the invention is described in relation to pearl buttons, it is to be understood that this is by way of example only, and that the process is of general application where a design in a thermo-setting liquid polyester is desired.

It is an object of the invention to provide a design in a thermosetting liquid polyester material that will greatly enhance the appearance of the final product.

It is another object to improve the process whereby the polyester material is poured into and retained enveloped in the mold cavities while air bubbles are removed, in order not to mar the final product.

It is still another object to apply the process of orientation of the pearl button to the outer periphery, as well as to the upper surface thereof.

Figure 1:
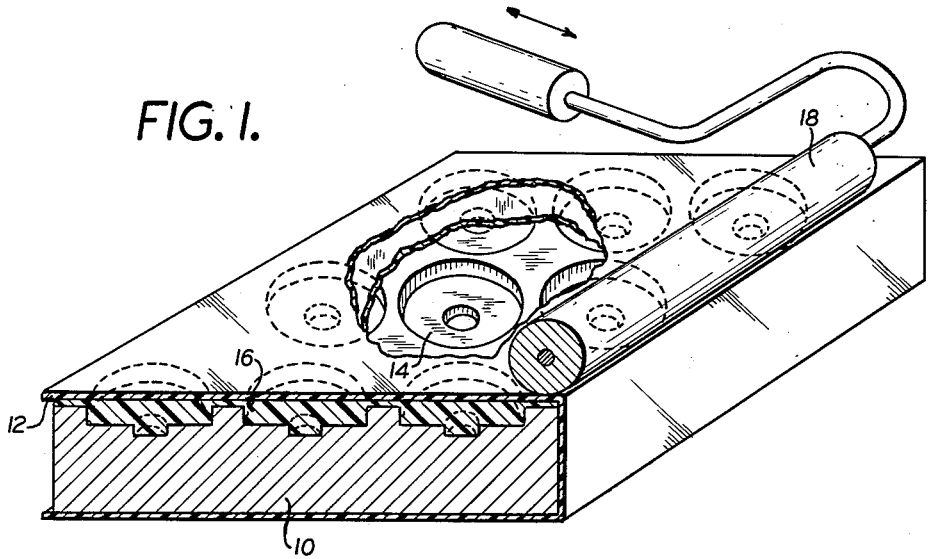
Figure 2:
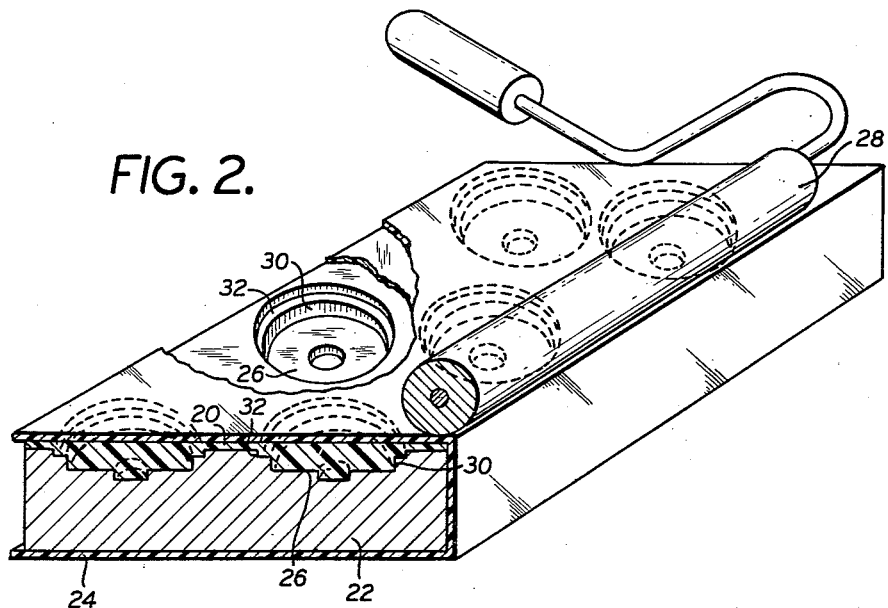

The objects, features and improvements of this invention will readily become apparent from the following description thereof, and the scope of which will be found in the claims, reference being made to the accompanying drawings wherein:

FIG. 1 is a perspective view of a mold illustrating the process and mold performed and constructed in accordance with the teachings of the invention, and FIG. 2 is a perspective view of a mold similar to FIG. 1, but illustrating a modified form of the process.

In carrying out the process of the invention, an unsaturated liquid thermosetting polyester resin is mixed with an organic peroxide as a catalyst and the composition is then heated to about 140–160° F. for about 1½ hours. The composition is cooled and about 3% pearl essence is added to the prepolymerized solution and the solution is then mixed thoroughly. The homogeneous mixture is then poured into a mold 10 that has previously been inserted into a close-fitting plastic or other membraneous pliable envelope or bag 12, having one end thereof remaining open. A plurality of cavities 14 provided in the face of the mold form, together with the space between the upper edge of the mold 10 and the enveloping cover 12, pockets in which the prepolymerized composition is retained. The pliable envelope or bag 12, fitting closely about and overlying all but one of the outer surfaces of the mold 10, does not fall or flow into the cavities 14 with the molding liquid, but remains in overlying relationship to cover the same. The molding liquid is viscous at this stage of the process, and contains numerous little air bubbles that tend to mar the appearance of the finished product. Therefore, the mold unit as a whole, including the mold 10 and its enveloping cover 12, is inserted into a vacuum chamber (not shown) to evacuate the air and thereby remove all air bubbles which would mar the finished product.

The air evacuation step causes the pliable bag 12 to adhere to the whole of the upper surface of the mold 10 since such surface is coated with the tacky molding material 16 initially poured thereover and into the cavities 14.

When the mold unit 10, 12 is removed from the air evacuating chamber, the pearl essence in the material 16 is oriented by causing the material 16 in the cavities 14 to flow under the pressure of a roller 18 removed across the outer surface of the cover 12. This is an important step in the process of the invention. Through orientation, the pearl essence of the viscous solution is caused to flow and move into a series of wavy lines which result in an aesthetic light reflecting design, bringing out the full luster of the material. Buttons, and other materials requiring a mother-of-pearl appearance, are thereby provided with realistic pearl-reflecting surfaces. Although the pressure applying device has been described as the roller 18, other light pressure applying devices, as a brush have also been found practical.

Referring to FIG. 1, it will be noted that the membraneous cover 12 is depicted as adhering to the mold surface by an exaggerated layer of material 16. This layer has been shown in exaggerated form solely to clarify the relationship of the elements as the roller 18 is pressed against the upper surface of the bag 12 and is worked therealong in a series of forward and rearward strokes. Because the cover 12 adheres to the mold 10, air cannot enter between the cover and mold surface after the mold is removed from the vacuum chamber. The mold is then placed into a heated press (not shown). The platens of the press are closed to apply pressure to the mold unit 10, 12 and the temperature is raised to approximately 250–275° F. for about 3 minutes. Thereafter, the finished product is removed from the mold and a lustrous, pearl-like button is obtained.

In actual practice, it has been possible to provide the products molded in accordance with this process with designs falling within a predetermined range. This may be accomplished simply by providing the molding platen of the press with a predetermined design configuration. When the platen bearing the design is pressed against the cover 12 and its surface configuration impressed into the material 16 in the cavities 14, the material is caused to flow and form different designs which subsequently harden as the material cures in the press.

The inventive concept of orientation of the pearl essence may be produced through to the very outer periphery of a button or similar product, by means of the mold depicted in FIG. 2. The prepolymerization of the unsaturated polyester is obtained in the same manner described above. The viscous material 20, containing the pearl essence is poured into the mold unit comprising the mold 22 and covering 24. The material 20 is poured into the pocket formed between the membrane 24 and the upper surface of the mold 10 and flows into the cavities 26 formed therein as described with respect to the embodiments shown in FIG. 1. Air is evacuated as before, and orientation of the pearl essence is accomplished by the application of pressure by the roller 28.

In practice, the mold cavities 26 are formed with two diameters. The conventional large and deep cavity 30 forms the usual outer surface of a button or other product. A second shallower peripheral cavity 32 positioned adjacent the upper surface of the mold 22 is approximately 0.050 to 0.075 of an inch larger in radius than the diameter of cavity 30.

As is evident from inspection of FIG. 2, the viscous prepolymerized composition fills the entire mold cavity, including areas 30 and 32. During the orientatioin step, the pearl essence in the material 20 flow and form the mother-of-pearl designs throughout the cavity portions 30 and 32. After the product is cured and removed from its mold cavity 26, the excess diameter 32 is then removed to the diameter 30, leaving the peripheral edge of the button with a lustrous, pearl-like appearance, exactly as is obtained for the outer surface of the button.

Once again the invention includes the concept of adding to the upper platen of the press any design which is desired to be impressed onto the surface of the button or product in the mold cavity. As in the embodiment of FIG. 1, when the press is closed, the design in the upper platen contacts the tight-fitting membrane 24, and is impressed into the upper surface of the thermosetting material being cured in the press.

It should be noted that the thin, membraneous cover closely approximates the form of the mold 10, 22. This combination of a form-fitting covering and a mold enveloped therein is referred to herein as a "mold unit." When the thermosetting material is poured into the mold unit, it is contained by the bag-shaped covering membrane which forms a pocket to direct its flow into the mold cavities.

Obviously, the invention may be utilized for many products, other than buttons, and remain within its scope. Modifications of the foregoing examples are possible and the scope of the invention will be defined by the appended claims.

I claim:

1. In a process for producing a lustrous surface decoration in a thermosetting composition material having a surface decoration essence therein comprising pouring said material into a mold unit including a mold having at least a product forming cavity defined therein covered by a membrane to form a pocket with said mold cavity, applying a flowing pressure to the thermosetting composition material until the surface decoration essence has risen to the surface of said cavity, and applying heat and pressure to the composition material to obtain a hard, insoluble product having a lustrous appearance.

2. In a process for producing a lustrous surface decoration in a thermosetting composition material having a surface decoration essence therein comprising placing a mold having cavities defined therein into a pliable formfitting membrane having an open side to form a pocket therebetween, pouring the composition into the pocket to fill the cavities, removing air from said composition and from said pocket, orienting the surface decoration essence by applying a flowing pressure to said material, and applying heat and pressure to said mold and membrane.

3. A process or producing a lustrous surface decoration in a thermosetting composition material containing a decoration essence therein comprising placing a mold having product forming cavities defined therein in a formfitting membraneous container having an open side, pouring the composition material into the cavities of said mold and between said open side of said membraneous container and said mold, orienting the decoration essence in said material by applying a flowing pressure to said material, and applying heat and pressure to said mold and container and to said composition material in the cavities of said mold.

4. The process of claim 3, wherein the mold is placed in a vacuum chamber prior to orienting said decoration essence in said material to remove air bubbles contained in said material.

5. The process of claim 3, wherein the cavities are provided with a peripheral shallow depression adapted to receive an additional amount of said material therein whereby the lustrous surface will be obtained along the peripheral edge thereof.

6. The process of orienting a prepolymerized composition material containing a pearl esssence comprising pouring the composition material into a mold unit having cavities therein covered by tight-fitting membrane having an open side through which the composition is poured, applying a flowing pressure on the upper surface of the membrane above the composition in said cavities until the pearl essence floats to the upper surface of the mold cavity, and applying heat and pressure to said mold unit.

7. In the process of claim 6, evacuating air from said cavities to effect a sealing cover for the material retained in the mold by said membrane adhering to the composition and said composition in turn adhering to the defining walls of the cavity in which the same is positioned.

References Cited in the file of this patent

UNITED STATES PATENTS

| | | |
|---|---|---|
| 1,607,623 | Higgins | Nov. 23, 1926 |
| 1,958,184 | Gross | May 8, 1934 |
| 2,106,009 | Lee | Jan. 18, 1938 |
| 2,289,713 | Land | July 14, 1942 |
| 2,380,363 | Land et al. | July 10, 1945 |
| 2,411,497 | Barnes | Nov. 26, 1946 |
| 2,475,375 | Clark | July 5, 1949 |
| 2,500,494 | Jeffers | Mar. 14, 1950 |
| 2,686,129 | Seiferth | Aug. 10, 1954 |
| 2,744,475 | Ayres | May 8, 1956 |